United States Patent [19]

Furukawa et al.

[11] Patent Number: 4,626,867

[45] Date of Patent: Dec. 2, 1986

[54] METHOD OF PREVENTING UNREGISTERED PRINTING IN MULTI-NOZZLE INK JET PRINTING

[75] Inventors: Tatsuya Furukawa, Yokohama; Masanori Horike, Tokyo, both of Japan

[73] Assignee: Ricoh Company, Ltd., Tokyo, Japan

[21] Appl. No.: 662,059

[22] Filed: Oct. 18, 1984

[30] Foreign Application Priority Data

Oct. 22, 1983 [JP] Japan ............................... 58-197911

[51] Int. Cl.[4] ............................................ G01D 15/18

[52] U.S. Cl. ....................................... 346/1.1; 346/75; 346/140 R

[58] Field of Search ....................... 346/75, 140 R, 1.1, 346/75, 140 R

[56] References Cited

U.S. PATENT DOCUMENTS

| | | | |
|---|---|---|---|
| 3,992,713 | 11/1976 | Carmichael et al. | 346/75 |
| 4,158,204 | 6/1979 | Kuhn et al. | 346/75 |
| 4,167,013 | 9/1979 | Hoskins et al. | 346/75 |
| 4,412,226 | 10/1983 | Yoshida | 346/1.1 |
| 4,429,315 | 1/1984 | Tamai et al. | 346/75 |
| 4,524,346 | 6/1985 | Bain et al. | 346/1.1 |

*Primary Examiner*—E. A. Goldberg
*Assistant Examiner*—Gerald E. Preston
*Attorney, Agent, or Firm*—Oblon, Fisher, Spivak, McClelland & Maier

[57] ABSTRACT

In multi-nozzle ink jet printing for divisional-printing or color-printing information on a single paper with ink of a same color or of different colors ejected from a plurality of nozzles which are mounted on a carriage, a unique method is provided for the prevention of unregistered printing of an image due to positional deviation between the ink issuing from the respective nozzles with respect to a direction of movement of the carriage. A difference in position between ink drops from the respective nozzles with respect to the direction of carriage movement is detected so as to determine the timings for starting printing with the ink from the respective nozzles based on the detected difference.

8 Claims, 11 Drawing Figures

Fig. 1A
Fig. 1B
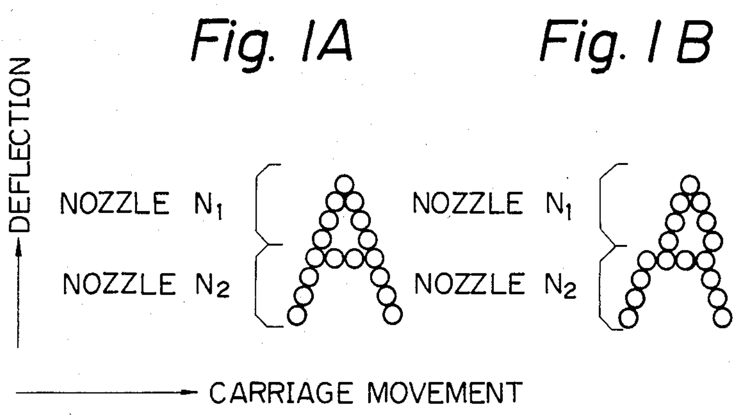
Fig. 7
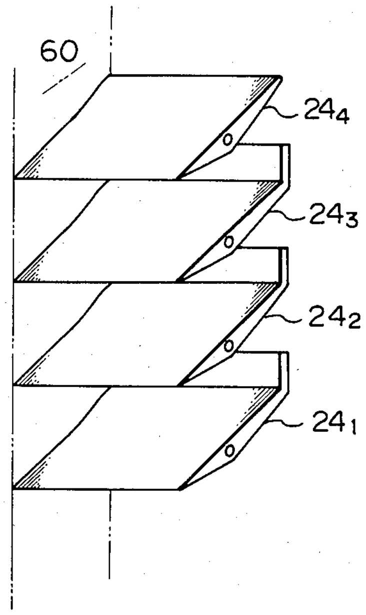

METHOD OF PREVENTING UNREGISTERED PRINTING IN MULTI-NOZZLE INK JET PRINTING

BACKGROUND OF THE INVENTION

The present invention relates to multi-nozzle ink jet printing for divisional-printing or color-printing information on a same paper by use of a plurality of nozzles which are mounted on a carriage and eject ink of a same color or of different colors. More particularly, the present invention relates to a method of preventing images on the paper from being being unregisitered due to positional deviation between the ink issuing from the nozzles with respect to an intended direction of movement of the carriage.

In one type of prior art color ink jet printers, a plurality of ink ejection nozzles are mounted on a carriage and supplied respectively with ink of different colors so that monochromatic information may be reproduced by ink ejection from particular one of the nozzles or, alternatively, multi-color information by ink ejection from a plurality of nozzles. For example, a color ink jet printer disclosed in Japanese Patent Application No. 56-210743/1981 includes a charged drop detection electrode located ouside and adjacent to a side platen, which is loaded with a paper, and causes nozzles to sequentially face the detection electrode to thereby control ejected ink drops to a predetermined height. Such allows ink drops from the respective nozzles to share the same amount of deflection in a direction perpendicular to an intended direction of movement of the carriage, i.e. direction of ink drop deflection. Such deflection adjustment is adapted for the prevention of unregistered printing in the above-mentioned direction, e.g. deviation of colors in multi-color printing.

In the prior art ink jet printer discussed above, it sometimes occurs that the direction of ink ejection is shifted due to machining errors, assembling errors and others, or that upon operation of the printer after a several days of suspension the direction of ink ejection is shifted within a range of substantially $\pm 100$ microns owing to solidification of ink due to drying in the vicinity of the nozzles. So long as the shift or deviation of the ejection direction occurs in the direction of ink drop deflection, it is not causative of unregistered printing by virtue of compensation accomplished by the previously mentioned deflection adjustment. However, when the ejection direction of ink from one or more nozzles is shifted in the direction of movement of the carriage, compensation fails to be implemented by the deflection adjustment and color deviation is brought about in the carriage moving direction.

Such a problem is also encountered with a case wherein, in order to effect divisional-printing on a paper with respect to the deflection direction, a plurality of nozzles are arranged side by side along the direction of carriage movement and so set beforehand as to eject ink in different directions with respect to the ejection direction as well, the difference corresponding to a predetermined printing width. For example, as shown in FIGS. 1A and 1B, divisional-printing is accomplished by use of two nozzles $N_1$ and $N_2$ which are mounted on a carriage and shifted in position from each other in both the direction of carriage movement and the deflection direction. In FIGS. 1A and 1B, assume that upper half of a character A, for example, is printed out by the nozzle $N_1$ which enters a predetermined printing zone first in response to the movement of the carriage, and lower half of the character A by the nozzle $N_2$ which enters the printing zone with a delay associated with the positional deviation between the two nozzles with respect to the direction of carriage movement. Then, so long as the directions of ink ejection from the two nozzles $N_1$ and $N_2$ are normal, they will print out the character A in an orderly configuration as shown in FIG. 1A. However, should any of the nozzles be dislocated even a little in the direction of carriage movement, only a disfigured or unregistered character would be printed out as shown in FIG. 1B. Here, deviation in the deflection direction may be compensated by the previously discussed deflection adjustment.

SUMMARY OF THE INVENTION

It is therefore an object of the present invention to eliminate unregistered printing due to deviation, with respect to direction of carriage movement, of ink which is ejected by a plurality of nozzles mounted on the carriage.

It is another object of the present invention to provide a generally improved method of preventing unregistered printing in multi-nozzle ink jet printing.

A method of preventing unregistered printing from occurring in an intended direction of movement of a carriage of the present invention is applicable to multi-nozzle ink jet printing which uses a plurality of ink ejection nozzles arranged on the carriage with ejection positions thereof shifted from each other in the direction of carriage movement so as to print information on a paper with ink issuing from the nozzles. The method comprises the steps of detecting arrival of ink drops ejected from the respective nozzles while driving the carriage at a predetermined velocity, computing a difference between timings of the arrival of the ink drops from the respective nozzles, and setting timings at which printing with the ink from the respective nozzles is to be started in response to the computed difference.

In accordance with the present invention, in multi-nozzle ink jet printing for divisional-printing or color-printing information on a single paper with ink of a same color or of different colors ejected from a plurality of nozzles which are mounted on a carriage, a unique method is provided for the prevention of unregistered printing of an image due to positional deviation between the ink issuing from the respective nozzle with respect to a direction of movement of the carriage. A difference in position between ink drops from the respective nozzles with respect to the direction of carriage movement is detected so as to determine the timings for starting printing with the ink from the respective nozzles based on the detected difference.

The above and other objects, features and advantages of the present invention will become apparent from the following detailed description taken with the accompanying drawings.

BRIEF DESCRIPTION OF THE DRAWINGS

FIGS. 1A and 1B are plan views of exemplary images printed by divisional-printing using two nozzles, FIG. 1A showing a normal image and FIG. 1B, an image unregistered with respect to a direction of carriage movement;

FIG. 7 is a perspective view of an arrangement of charge detection electrodes applicable to another embodiment of the present invention.

DESCRIPTION OF THE PREFERRED EMBODIMENTS

While the method of preventing unregistered printing in multi-nozzle ink jet printing of the present invention is susceptible of numerous physical embodiments, depending upon the environment and requirements of use, substantial numbers of the herein shown and described embodiments have been made, tested and used, and all have performed in an eminently satisfactory manner.

Figure 2:
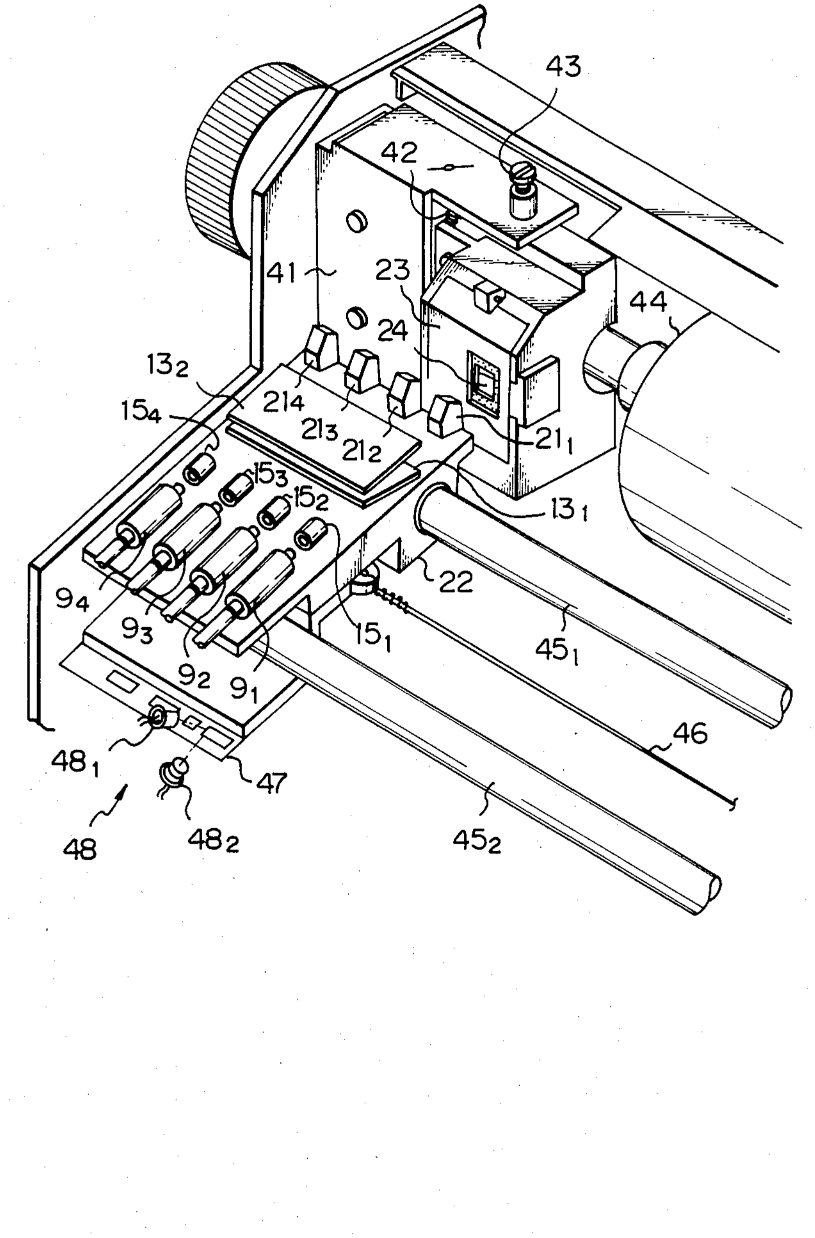
FIG. 2 is a fragmentary perspective view of a color ink jet printer for practicing the method of the present invention.

Referring to FIG. 2 of the drawings, an ink jet printer for practicing the method of the present invention is shown. The ink jet printer includes a carriage 22 on which, in the illustrative embodiment, four ink ejection heads $9_1$–$9_4$, four charging electrodes $15_1$–$15_4$, a pair of deflection electrodes $13_1$ and $13_2$, and gutters $21_1$–$21_4$ are mounted. A charge detection electrode 24 is located in a position where it will receive ink drops ejected by the head $9_1$ and charged by the electrode $15_1$ when the carriage 22 assumes its home position as illustrated. A gutter 23 adapted to support the electrode 24 is connected to a support frame 41 by a link and is constantly biased upwardly by a tension spring 42. Meanwhile, an adjusting screw 43 limits the upward movement of the gutter 23 by its tip. The screw 43, therefore, allows the electrode 24 to be adjusted in position in the vertical direction.

A paper (not shown) is wound around a platen 44. The carriage 22 is driven by a servo motor by way of a wire 46 to move on and along guide bars $45_1$ and $45_2$ in a reciprocal motion. The carriage 22 is provided with a slotted plate 47 at its tail. A light emitting diode $48_1$ and a phototransisotr $48_2$, which in combination constitute a home position sensor 48, are located to face each other while being intervened by a slot of the plate 47.

Figure 3:
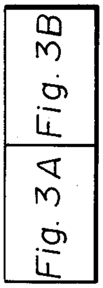
FIG. 3 (3A and 3B) is a schematic block diagram of an ink supply system included in the ink jet printer shown in FIG. 2.
Figure 3A:
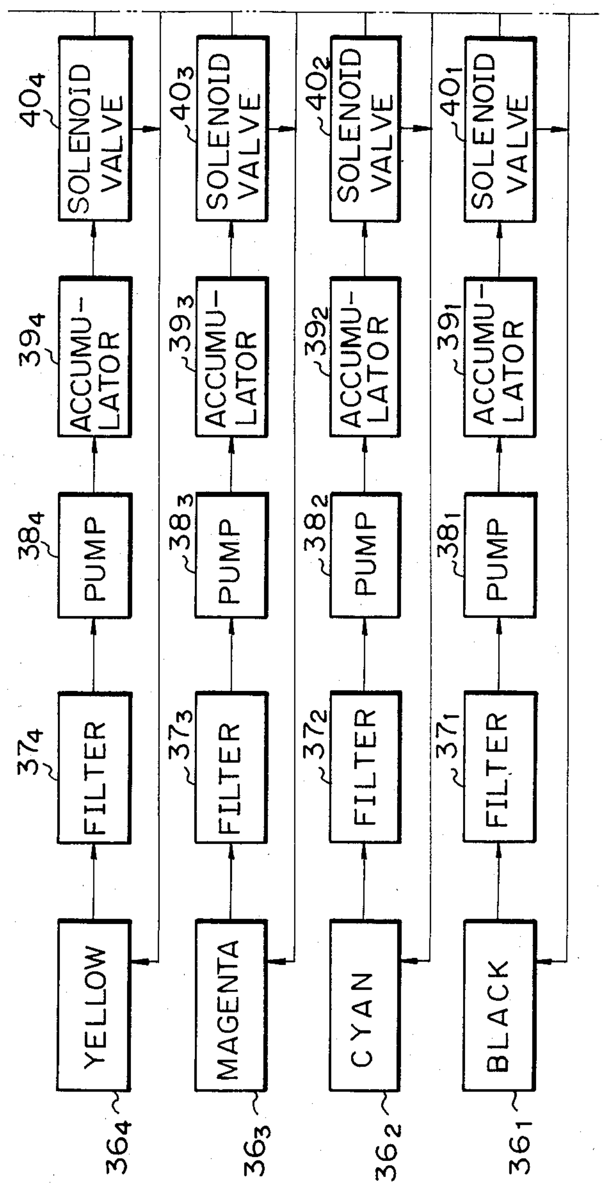
Figure 3B:
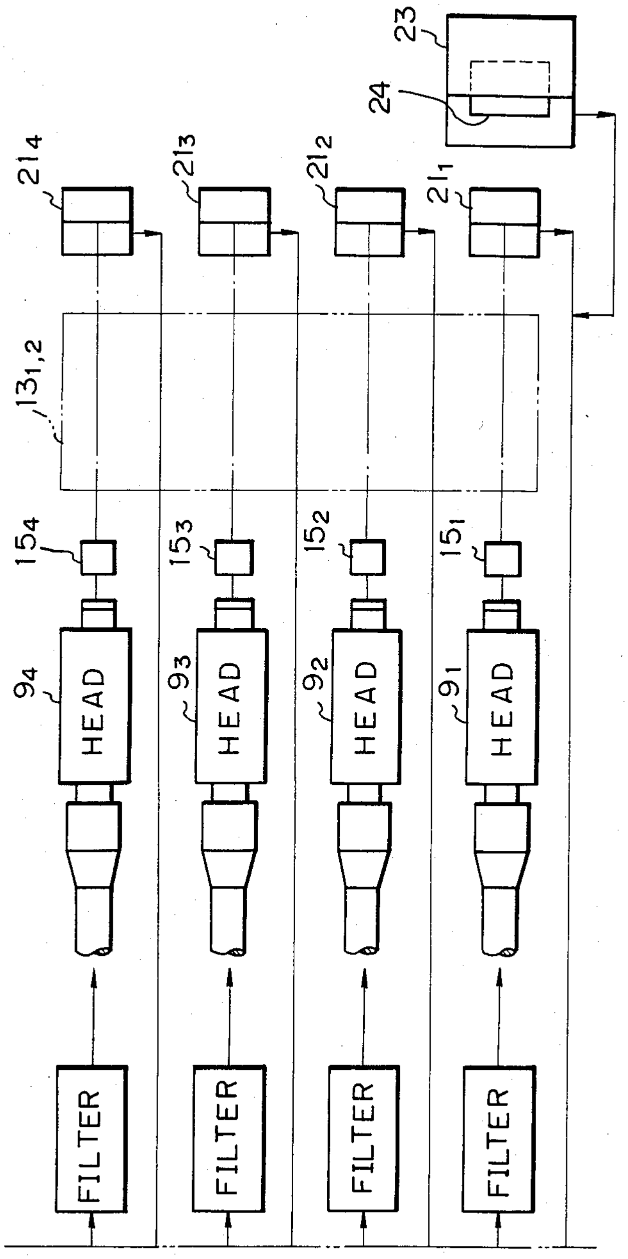

An ink supply system associated with the heads $9_1$–$9_4$ is shown in FIG. 3. In this particular embodiment, one of the four heads is supplied with black ink and the others with cyan ink, magenta ink and yellow ink, respectively, to furnish the printer with color printing capability.

Figure 4:
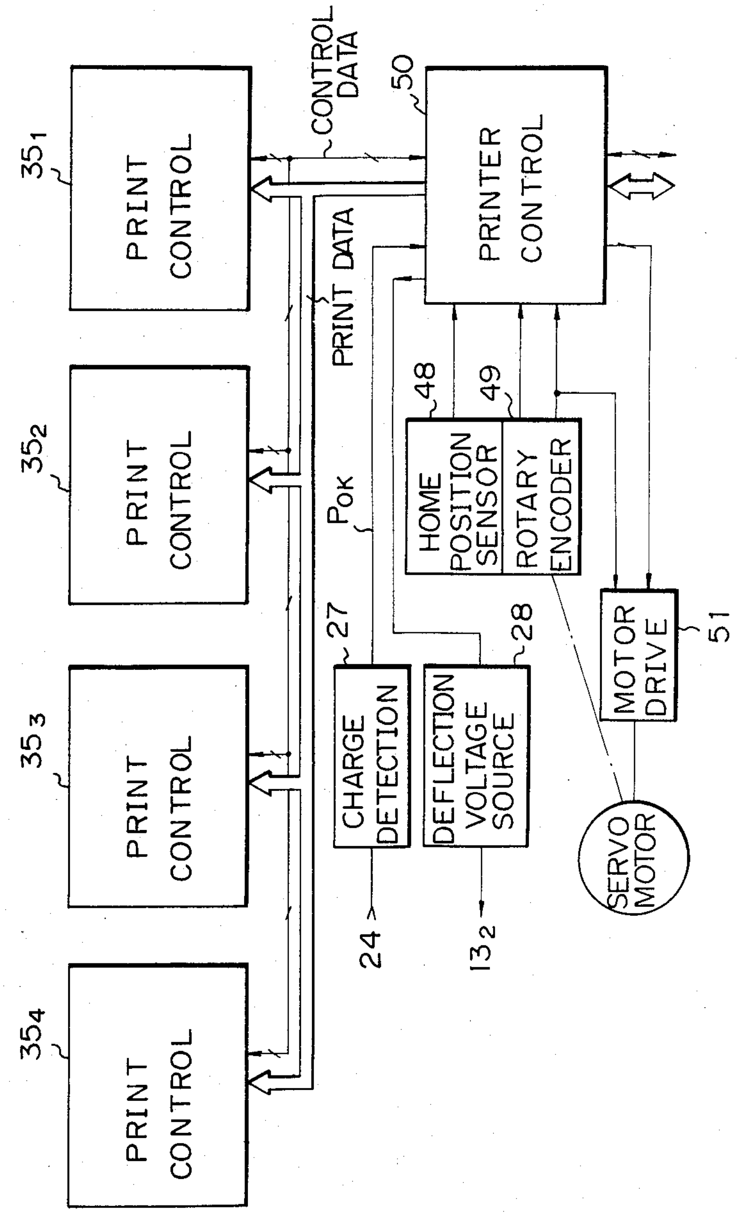
FIG. 4 is a schematic block diagram of a print control system also included in the ink jet printer of FIG. 2.

An electrical arrangement of the ink jet printer is shown in FIG. 4. In view of the fact that the charge control over the four heads in the illustrative embodiment is complicated, four independent print control units $35_1$–$35_4$ respectively are associated with the heads $9_1$–$9_4$ for performing ink ejection control, phase search, deflection adjustment and print charge control thereon. A printer control unit 50 performs drive and positioning control over the carriage 22, distribution of information to be printed out, notification of a charge detection signal $P_{ok}$, on-off control over a deflection voltage source circuit 28, and detection of a deviation in timing and print start timing control over the respective heads in accordance with the present invention.

Figure 5:
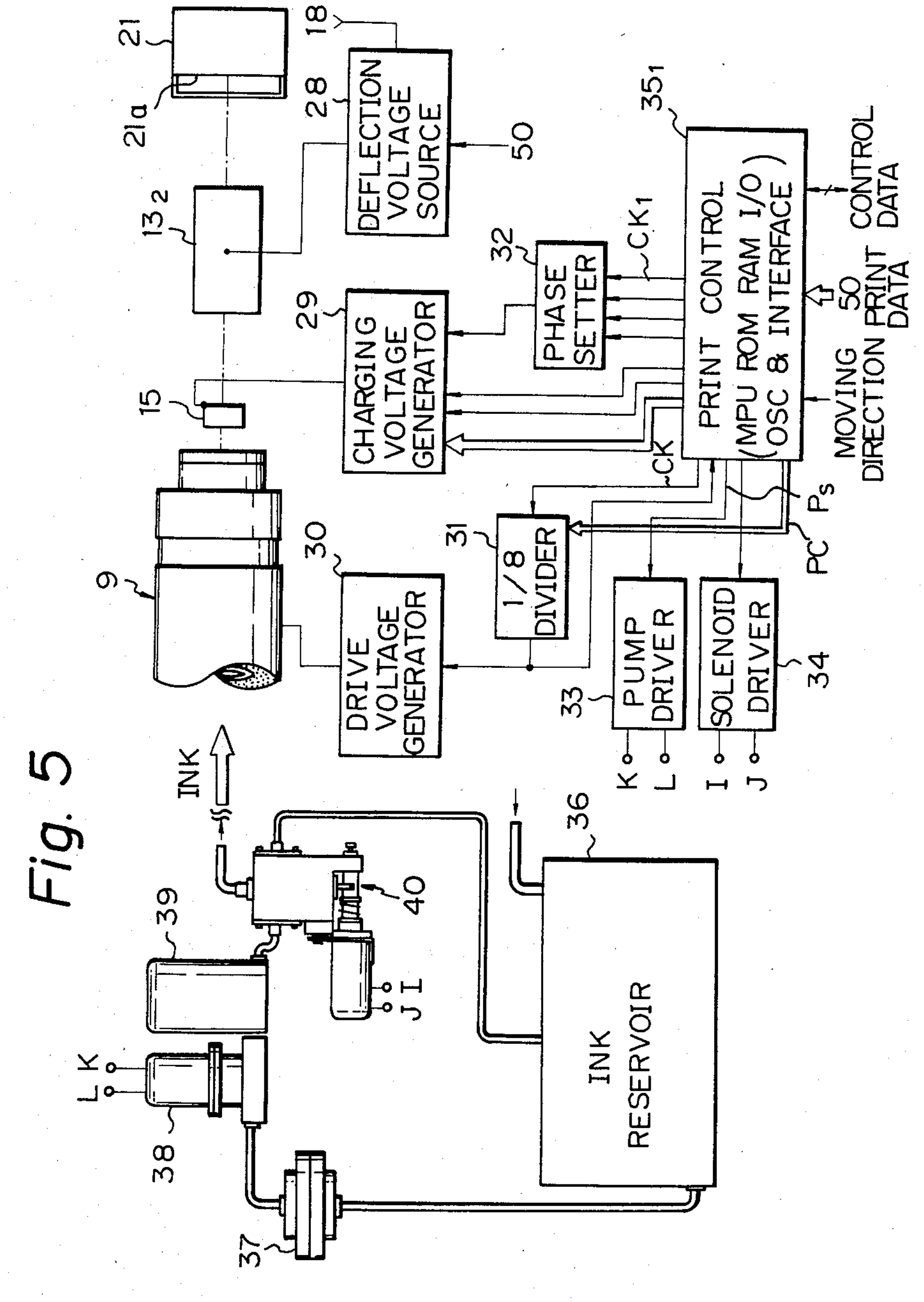
FIG. 5 is a block dagram representative of a combination of an ink supply system and a print control system.

The print control units $35_1$–$35_4$ are identical in construction. The print control unit $35_1$ is shown in FIG. 5 by way of example in combination with various electrical energizing circuits and a mechanical arrangement for ink ejection. In this particular embodiment, the print control unit $35_1$ comprises a microprocessor MPU (or CPU), a read only memory (ROM), a random access memory (RAM), input/output ports I/O, a clock pulse generator OSC, an interface including a frequency divider, an amplifier, a counter, an analog-to-digital (A/D) converter, a digital-to-analog (D/A) converter and other necessary elements, etc. Supplied with a command and print data from the printer control unit 50, the print control unit $35_1$ starts and stops ink ejection, sets an ink pressure, searches a phase, sets a deflection, and controls printing (distribution of charge voltage code).

The control operations mentioned above and the constructions and operations of the electrical energizing circuits shown in FIG. 5 are shown and described in detail in the aforementioned Japanese Patent Application No. 56-210743/1981 and will be outlined hereinafter. In response to a prepare for print command, the print control unit $35_1$ drives a pump 38 and then energizes a solenoid associated with a solenoid-operated valve 40 to open while triggering a timer. Upon the lapse of a predetermined time, the controller $35_1$ checks a pressure of ink applied to the head 9 and, if it is not a predetermined reference pressure, changes the energizing level of the pump 38 until the actual ink pressure settles at the reference pressure. After the control of the ink pressure to the reference level, the print control unit $35_1$ performs phase search and deflection control, then informs the printer control unit 50 of its ready state, and then performs print control as soon as a print command is applied thereto from the unit 50. In the course of the print control, the unit $35_1$ starts printing every time it receives a print start command from the unit 50.

When the printer control unit 50 is powered itself, it initializes the input/output ports and other various portions and, then, delivers an ink ejection command to the print control units $35_1$–$35_4$. Thereafter, the printer control unit 50 reads a state of a sheet supply system asociated with the platen and those of the print control units $35_1$–$35_4$ (particularly failure signal) and, if any failure exists, activates an alarm and, if not, reads a key input through an operation board. If the key input is commanding printing in black, the controller 50 jumps to a black print subroutine. Likewise, if the key input is commanding printing in cyan, magenta or yellow, the controller 50 jumps to a cyan, magenta or yellow print subroutine. Further, if the key input is commanding none of them, the controller 50 jumps to a full-color print subroutine.

Upon return from any of the subroutines, the controller 50 sees if a start command is present and, when a start command has arrived for the first time, sets a start flag and, then, sees if the print control unit ($35_1$–$35_4$) is ready. Where a black print ready flag has already been set in the black print subroutine in response to a black print command, the controller 50 enters into a print control. The controller 50 references a cyan print ready flag in response to a cyan print command, a magenta print ready flag in response to a magenta print command, a yellow print ready flag in response to a yellow print command, and a full-color print ready flag in response to a full-color print command. The print control starts with timing detection and, then, advances to an actual print control.

Figure 6A:
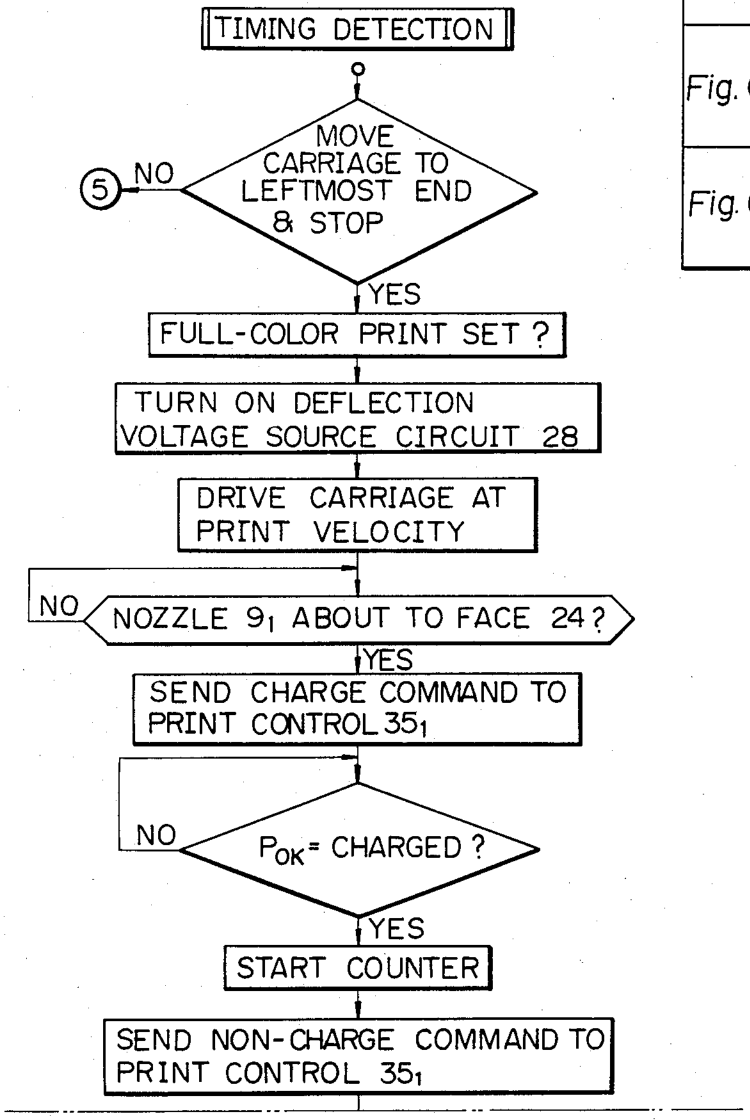
FIG. 6 (6A and 6B and 6C) is a flowchart demonstrating a timing detection and control operation of a microprocessor of a printer control unit shown in FIG. 4.
Figure 6:
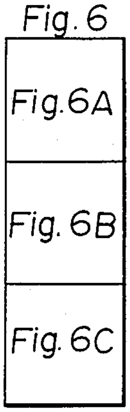
Figure 6B:
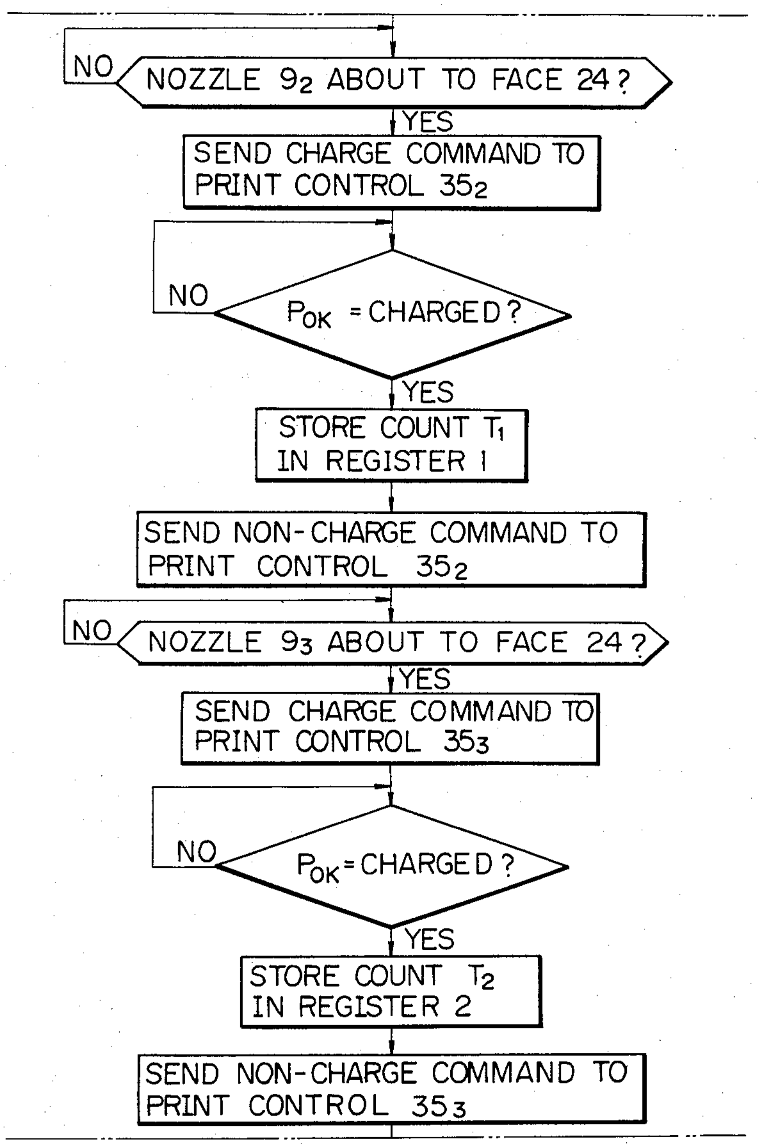
Figure 6C:
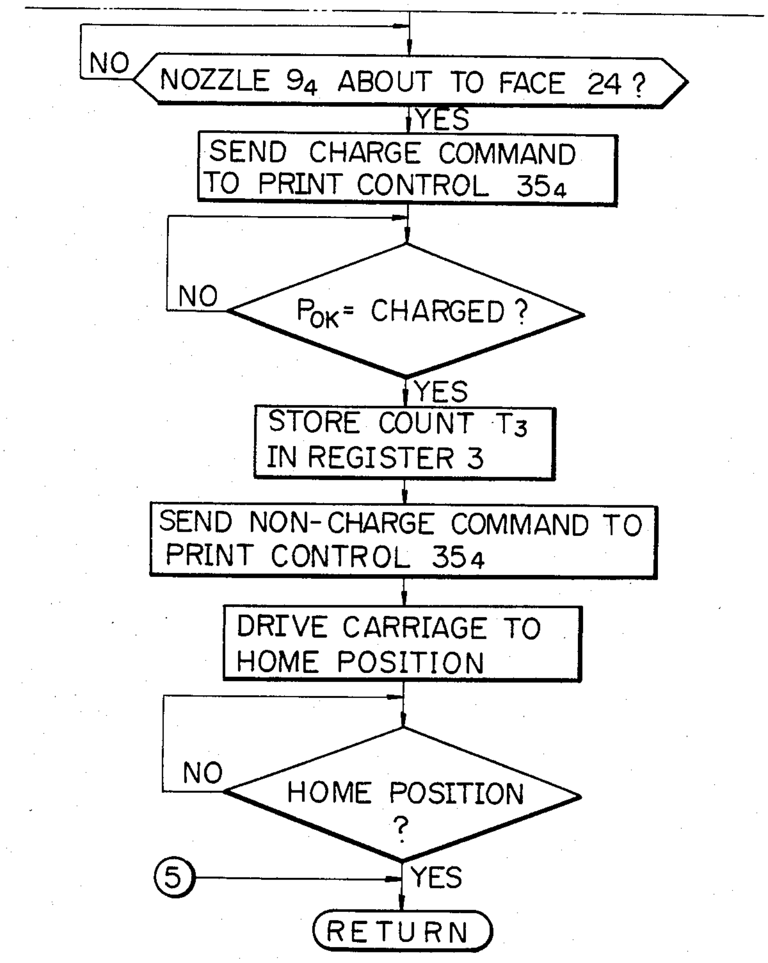

Referring to FIG. 6, the operation of the controller 50 for detecting timings is shown. In FIG. 6, while a full-color print has not been set, meaning printing with a single nozzle, the controller 50 returns to the main print control function even though it once advances to the timing detection flow. If the full-color print has been set, a microprocessor included in the controller 50 first drives the carriage 22 to the leftmost position in FIG. 2 and stops it there. Then, the controller 50 turns on the deflection voltage source circuit 28 and drives the carriage 22 to the right in FIG. 2 at a velocity for printout operations. During the movement of the carriage 22, the controller 50 counts up pulses generated by a rotary encoder 49. As soon as a count is reached which represents a carriage position where ink issuing from the head $9_1$ is moving toward an opening of the gutter 23 but has not reached the charge detection electrode 24 yet, the controller 50 delivers a charge command to the print control unit $35_1$. As a result, ink drops ejected from the head $9_1$ and charged advance into the opening of the gutter 23. Due to the continuous movement of the carriage 22, the charged drops soon start impinging on the charge detection electrode 24 so that the output signal $P_{ok}$ of the charge detection circuit 27 changes its level to one indicative of "charged". When such a level of the signal $P_{ok}$ has developed for the first time, the microprocessor of the controller 50 triggers a clock pulse counter (program counter) to start counting time. Then, it applies a non-charge command to the print control unit $35_1$.

The microprocessor of the controller 50 delivers a charge command to the print control unit $35_2$ at a timing when the count of the pulses output from the rotary encoder 49 represents a position of ink issuing from the head $9_2$ which is aligned with the opening of the gutter 23 but short of the charge detection electrode 24. As a result, ink drops ejected from the head $9_2$ and charged advance into the opening of the gutter 23. Since the carriage 22 is in travel, the charged drops soon start impinging on the charge detection electrode 24 changing the level of the signal $P_{ok}$ to one indicative of "charged". When the level indicative of "charged" has been reached for the first time, the microprocessor of the controller 50 stores a time count $T_1$ in a register 1 and, then, delivers a non-charge command to the print control unit $35_2$.

Next, the microprocessor applies a charge command to the print control unit $35_3$ when a count of the encoder pulses indicates a position of the ink issuing from the head $9_3$ which is adjacent to the opening of the gutter 23 but short of the charge detection electrode 24. As a result, the ink drops ejected from the head $9_3$ and charged move into the opening of the gutter 23. Due to the continuous movement of the carriage 22, the drops come to impinge on the electrode 24 in due course so that the output signal $P_{ok}$ of the charge detection circuit 27 turns to a level which indicates "charged". When such a level of the signal $P_{ok}$ has been reached for the first time, the microprocessor of the controller 50 stores a time count $T_2$ in a register 2 and, then, applies a non-charge command to the print control unit $35_3$.

Thereafter, the microprocessor delivers a charge command to the print control unit $35_4$ when the count of the encoder pulses represents a position of ink issuing from the head $9_4$ which is adjacent to the opening of the gutter 23 but short of the charge detection electrode 24. This allows the ink drops ejected from the head $9_4$ and charged to move into the gutter 23. Due to the movement of the carriage 22, the charged drops soon start impinging on the electrode 24 to change the signal $P_{ok}$ to a level which indicates "charged". Upon the first appearance of such a level of the signal $P_{ok}$, the microprocessor stores a time count $T_3$ in a register 3 and, then, applies a non-charge command to the print control unit $35_4$.

The controller 50 temporarily stops the movement of the carriage 22, then drives it back to the home position, and then stops it there. This is the end of timing detection and the operation advances to an actual print control.

In the actual print control, the controller 50 drives the carriage 22 to the right in FIG. 2 for a printing stroke and, as soon as the carriage 22 is moved out of the home position, starts counting pulses output from the rotary encoder 49. When a count associated with the leftmost end of a predetermined print zone has been reached, the controller 50 causes the head $9_1$ to start printing (print command to print control unit $35_1$) and, at this instant, begins to count time. As the time count equals the value $T_1$ stored in the register 1, the controller 50 starts printing by the head $9_2$ (print command to print control unit $35_2$). Subsequently, as the time count equals the time $T_2$ stored in the register 2, the controller 50 starts printing by the head $9_3$ (print command to print control unit $35_3$). Further, as the time count equals the value $T_3$ stored in the register 3, the controller 50 starts printing by the head $9_4$ (print command to print control unit $35_4$).

When the scanning position of the head $9_1$ (count of rotary encoder output pulses) has been brought to the right end of the print zone, printing by the head $9_1$ is completed. Then, upon the lapse of the time $T_1$ printing by the head $9_2$ is terminated, then upon the lapse of the time $T_2$ printing by the head $9_3$ is terminated, and then upon the lapse of the time $T_3$ printing by the head $9_4$ is terminated. This is followed by driving the carriage 22 for a reverse stroke at a high velocity. This time, the controller 50 counts down the rotary encoder pulses and, upon decrement of the count to zero, decelerates the carriage 22 and, at the home position, stops it. If any more print data follows, the controller 50 repeats the carriage drive, print start control and like operations as described above.

In the embodiment shown and described, the carriage is driven for timing detection at the same velocity as for printing so as to detect the times $T_1$–$T_3$ between the detection of ink drops from the first head $9_1$ and that of ink drops from the other heads. If desired, however, an arrangement may be made such that the carriage is driven for timing detection at a lower velocity than for printing and the print start timings associated with the respective heads are determined based on the times $T_1$–$T_3$.

Where the resolution of the encoder output pulses (number of pulses/displacement) is relatively high, the encoder output pulses may be counted instead of time in order to determine the print start timings of the respective heads in response to the counts thereof, in which case a change in the scanning velocity of the carriage 22 is no problem.

Thus, detection of timings and setting of an initial print timing in accordance with the present invention may be implemented in terms of a time or a distance of movement of the carriage as desired.

The present invention has been shown and described in conjunction with a full-color ink jet printer of the type having nozzles which lie in an substantially common horizontal plane. However, the present invention is similarly applicable to divisional-printing wherein, for example, the ejection direction from the head $9_2$ is shifted vertically (deflection delection) upwardly relative to that of the head $9_2$ by a printing width (deflection width) assigned to one head, the ejection direction from the head $9_3$ is shifted vertically upwardly relative to that of the head $9_2$ by the same width, the ejection direction of the head $9_4$ is shifted vertically upwardly relative to that of the head $9_3$ by the same width, and ink of a single color is supplied to all the heads, so that data may be printed over a width four times wider than the printing width (deflection width) assigned to one head by a single scanning stroke of the carriage 22. In the case where the previously discussed direct collision type electrode is used for charge detection, the above-mentioned kind of divisional-printing may employ an electrode configuration shown in FIG. 7 by way of example. In FIG. 7, four charge detection electrodes $24_1$–$24_4$ are arranged one above another at common spacings equal to the printing width of one head and, in order to eliminate deviation in detection with respect to the carriage moving direction, their leftmost ends share the same vertical plane 60. For phase search at each head, an output $P_{oki}$ of the charge detection circuit 27 connected to one charge detection electrode **24*i* which is associated with a head 9*i* is referenced; for deflection adjustment, a charging voltage of the maximum deflection level is applied to the charging electrode and the charging voltage amplification gain is sequentially increased, thereby setting an amplification gain developed when the signal $P_{oki}$ indicates "uncharged (charged drops missing the upper end of the electrode 24*i*)" as a proper gain. For timing detection, charging is effected at a level lower than the maximum deflection level and charge detection is performed by the charge detection electrode 24*i*** so as to obtain the counts $T_1$–$T_3$ in the previously described manner.

While the ink drop detection means has been shown and described as comprising a collision type charge detection electrode and a charge detection circuit, such is only illustrative and the gist is that it is capable of detecting arrival of ink drops. So, alternative examples of the ink drop detection means include a non-contact, induction type electrode, a photosensor, and a pressure-sensitive element.

In summary, it will be seen that the present invention provides a method which eliminates unregistered printing attributable to deviation of an ejection direction with respect to a direction of carriage movement. This advantage is derived from the unique construction wherein a difference in position between streams of ink issuing from a plurality of nozzles in the direction of carriage movement is detected so as to predetermine print start timings for the respective nozzles based on the detected difference.

Various modifications will become possible for those skilled in the art after receiving the teachings of the present disclosure without departing from the scope thereof.

What is claimed is:

1. A method of preventing unregistered printing from occurring in an intended direction of movement of a carriage in multi-nozzle ink jet printing which uses a plurality of ink ejection nozzles arranged on the carriage with ejection positions thereof shifted from each other in the direction of carriage movement so as to print out information on a paper with ink issuing from the nozzles, said method comprising the steps of:

(a) detecting with a detecting element arrival of ink drops ejected from the respective nozzles while driving the carriage at a predetermined constant velocity, the detection being accomplished when there is a relative movement between said nozzle and said detection element;

(b) computing a difference between timings of the arrival of the ink drops from the respective nozzles; and (c) setting timings at which printing with the ink from the respective nozzles is to be started in response to the computed difference.

2. A method as claimed in claim 1, wherein the predetermined constant velocity of the carriage is equal to a velocity at which the cariage is moved for printing out information.

3. A method as claimed in claim 1, wherein the predetermined constant velocity of the carriage is lower than a velocity at which the carriage is moved for printing out information.

4. A method as claimed in claim 1, wherein step (b) comprises the step of (d) detecting a time interval between ddetection of the ink drop ejected from one of the nearby nozzles and detection of the ink drop ejected from the other nozzle.

5. A method as claimed in claim 1, wherein the detection of the ink drops at step (a) is performed by ink drop detection means which is positioned in front of the respective nozzles.

6. A method as claimed in claim 1, wherein at least two of the plurality of nozzles eject ink of different colors for color printing.

7. A method as claimed in claim 1, wherein the respective nozzles are shifted from each other in a direction perpendicular to the direction of carriage movement.

8. A method according to claim 1, wherein said detecting step comprises:

providing said detecting element in a detection region non-coincident with a region for paper printing;

moving said nozzels through said detection region for detection and computing said timings of the arrival of said ink drops from the respective nozzels;

performing said setting step; and moving said nozzles through said paper printing region after said setting step to print with ink drops based on the set timings.

* * * * *